US00RE47754E

(19) United States
(12) Reissued Patent
Nguyen et al.

(10) Patent Number: US RE47,754 E
(45) Date of Reissued Patent: Dec. 3, 2019

(54) ADAPTIVE AND USER LOCATION-BASED POWER SAVING SYSTEM

(71) Applicant: Samsung Electronics Co., Ltd., Suwon-si, Gyeonggi-do (KR)

(72) Inventors: Phuong Nguyen, San Jose, CA (US); Simon J. Gibbs, San Jose, CA (US)

(73) Assignee: Samsung Electronics Co., Ltd., Suwon-si (KR)

(21) Appl. No.: 14/528,516

(22) Filed: Oct. 30, 2014

Related U.S. Patent Documents

Reissue of:
(64) Patent No.: 8,306,634
Issued: Nov. 6, 2012
Appl. No.: 12/342,416
Filed: Dec. 23, 2008

(51) Int. Cl.

| | |
|---|---|
| ***G05B 11/01*** | (2006.01) |
| ***G05D 3/12*** | (2006.01) |
| ***G06F 1/3203*** | (2019.01) |
| ***G06F 1/3231*** | (2019.01) |
| ***G06F 1/26*** | (2006.01) |

(52) U.S. Cl.
CPC ..... *G06F 1/3203* (2013.01); *G06F 1/266* (2013.01); *G06F 1/3231* (2013.01); *Y02D 10/173* (2018.01)

(58) Field of Classification Search
CPC ..... G05B 15/02; G06F 1/266; G06F 3/0219; G06Q 50/06; G08C 19/28; G07C 9/00142; H02J 13/0079; H04B 1/707; H04L 12/2803; H04L 12/2805; H04N 21/42202
USPC ..... 340/31, 5.21, 12.22, 12.33; 700/11, 14, 700/19, 108; 709/219, 224; 725/114; 455/420, 433
See application file for complete search history.

(56) References Cited

U.S. PATENT DOCUMENTS 5,745,865 A * 4/1998 Rostoker et al. ..... 455/456.5
6,218,931 B1 * 4/2001 Asghar ..... H04B 1/707 340/12.33
6,563,430 B1 * 5/2003 Kemink et al. .. H04N 21/42202 340/12.22

(Continued)

OTHER PUBLICATIONS

Berardina Decarolia, 'Adapting Home Behavior to Its Inhabitants', Department of Information at the University of Bari, http://www.di.unibe.it/-nadja, pp. 282-285.

(Continued)

*Primary Examiner* — Christopher E. Lee

(57) ABSTRACT

An adaptive, user-centric system and network for controlling power consumption by an appliance is described. The appliance may be any type of powered apparatus, such as A/C units, heaters, computers, lights, kitchen appliances, home media centers, and so on. The power to these appliances is based on an estimated arrival time of the user to the destination where the appliance is located. It may also be based on previous performance data for the particular appliance, that is, given the current conditions (e.g., various environment temperature readings), how long has it taken in the past for the appliance to reach a certain level of operation. The location of the user is determined by a device that has some location-based services and is able to transmit this location/position data in a message to a power-control server. The server applies rules contained in the message to derive an estimated arrival time for the user which is used to power appliances at the user's destination.

14 Claims, 7 Drawing Sheets

(56) References Cited

U.S. PATENT DOCUMENTS

| | | | | |
|---|---|---|---|---|
| 6,889,173 | B2 * | 5/2005 | Singh | G06Q 50/06 700/108 |
| 6,919,790 | B2 * | 7/2005 | Kanazawa | G07C 9/00142 340/5.21 |
| 7,219,243 | B2 | 5/2007 | Lim | |
| 7,363,031 | B1 * | 4/2008 | Aisa | H02J 13/0079 340/3.1 |
| 7,389,436 | B2 | 6/2008 | Osborn | |
| 2003/0171113 | A1 * | 9/2003 | Choi | H04L 12/2803 455/420 |
| 2004/0039457 | A1 * | 2/2004 | Boldt | G08C 19/28 700/11 |
| 2005/0038875 | A1 * | 2/2005 | Park | H04L 12/2803 709/219 |
| 2005/0097618 | A1 * | 5/2005 | Arling | H04L 12/2805 725/114 |
| 2005/0159823 | A1 * | 7/2005 | Hayes | G05B 15/02 700/19 |
| 2006/0025132 | A1 * | 2/2006 | Karaoguz | H04L 12/2803 455/433 |
| 2007/0040700 | A1 * | 2/2007 | Bachelder | 340/902 |
| 2007/0073870 | A1 * | 3/2007 | Park et al. | G06F 3/0219 709/224 |
| 2010/0030466 | A1 * | 2/2010 | Rogers et al. | 701/201 |
| 2010/0127854 | A1 * | 5/2010 | Helvick et al. | 340/539.14 |

OTHER PUBLICATIONS

Neng-Shiang Liang, Li-Chen Fu, Chao-Lin Wu; "An integrated flexible, and Internet-based control architecture for home automation system in the Internet Era"; May 2002 IEEE; pp. 1101-1106.

* cited by examiner

ADAPTIVE AND USER LOCATION-BASED POWER SAVING SYSTEM

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

BACKGROUND OF THE INVENTION

1. Field of the Invention

The present invention relates to computer networks and power saving systems. More specifically, it relates to remote power control of devices and appliances using location-based data.

2. Description of the Related Art

With the cost of power increasing every year, consumers are becoming more sophisticated with regard to controlling power to devices and appliances in their home, workplace, and other environments. For example, consumers often use timers and sensors for controlling when to supply power to appliances. However, present power-saving systems are inefficient at managing power to device and appliances. Motion-based sensors often rely on a pre-defined range or direct contact with the sensor. Time-based systems are not sufficiently flexible; they simply turn devices on or off based on time, which may vary by day. Sensor-based power solutions, such as thermal sensors, often rely on direct contact with physical bodies (i.e., with a human being) or ambient objects, which may be unsuitable in situations where a user would like an appliance to be powered on at a certain time that is coordinated with the user's arrival time.

Moreover, consumer power preferences or power profiles are not portable. They are often tied to a particular location. Users who often like to have their power-consumption preferences, that is, preferences as to when they would like their devices powered on or off, travel with them or be portable. Furthermore, existing sensors control power to devices based on times and days set in a schedule that may change based on real-life events where a user might use a device, not when the user actually needs the device. Time-based systems simply follow a set schedule and control power to devices regardless of whether the consumer is there to use the device. As noted, other sensor-based power control systems rely solely on user presence or an ambient condition, and thus are not suitable for devices or appliances that are preferably powered on a certain time before the consumer is ready to use them, whether that time be one hour (such as with air conditioning units, heaters, etc.) or a few minutes (file servers, media center PCs, and the like).

SUMMARY OF THE INVENTION

A user-centric system and network for controlling power consumption by an appliance is described. The appliance may be any type of powered apparatus, such as A/C units, heaters, computers, lights, kitchen appliances, home media centers, and so on. The power to these appliances may be based on an estimated arrival time of the user to the destination where the appliance is located. It may also be based on previous performance data for the particular appliance; that is, given the current conditions (e.g., various environment temperature readings), the length of time it has taken in the past for the appliance to reach a certain level of operation may be considered. The current conditions may be determined from sensor data from a network (or one) sensor, such as thermal, noise, motion, or light-sensitive sensors. The location of the user is determined by a device that has some location-based services and is able to transmit tins location/position data in a message to a power-control server. The server retrieves a power-saving profile based on data in the message and applies rules contained in the message to derive an estimated arrival time for the user which is used to determine when to power one or more appliances at the user's destination. In this manner, the appliance is turned on at a time that allows the user full benefit from operation of the appliance upon arrival and without wasting any power, that is, without turning the appliance on too soon.

One embodiment is a method of controlling the operation of a power-consuming appliance. A location message from a power-control enabled device is received. This message may contain information on the location and position of a user carrying a device, wherein the device is capable of providing this user-centric location information, and may be referred to as a power-control enabled device. The message may also contain information on the power-control enabled device itself. Once received, a power-saving profile using device data in the location message is retrieved. Location data contained in the message is used to control operation of the power-consuming appliance such that the timing of the appliance operation (e.g., turning it on or off, or adjusting its level of output) is determined based on the user location indicated in the location message and may be based on other factors as well, such as previous performance or historical data. Controlling operation of the appliance may involve executing power-related rules. In another embodiment, sensor data is received from one or more sensors.

Another embodiment is a system or apparatus for controlling operation of an appliance. The system includes a processor, a network interface for receiving a location, and a power-supply component interface for transmitting instructions to one or more power-supply components (which are plugged into power outlets and supply power to appliances). Also included is a power-control module having a location message parsing component for parsing the location message. A memory stores at least one power operation rule associated with the appliance and at least one power-saving profile. The power-related profile may contain appliance data, sensor component data, and rules data. A system as recited in claim B1 wherein the power control module calculates a wait time period relating to a time the power control module sends an operation control instruction to the appliance, wherein the calculation is based on data in the location message. In another embodiment, the system memory also stores previous power-related performance data relating to the appliance receiving power form the one or more power-supply components. In another embodiment, the wait time period calculation may be based on the previous performance data and on sensor data.

Another embodiment is a network for controlling operation of a power-consuming appliance. The network includes at least one device, such as a mobile phone, having a power-related module or a dedicated power-related device, a power controller component having a power-saving profile and a power supply logic component. Also included is a power supply component for regulating operation of the power-consuming appliance.

BRIEF DESCRIPTION OF THE DRAWINGS

References are made to the accompanying drawings, which form a part of the description and in which are shown, by way of illustration, particular embodiments.

DETAILED DESCRIPTION OF THE INVENTION

Methods and systems for controlling power supplied to appliances based on user location and using user power-saving profiles are described in the various figures. Location-based sensors are preferred. Such sensors provide power to devices based on the location of the consumer, for example, how far the consumer is from her home or office determines when devices will be powered on. Such power saving control systems need to be adaptive to a consumer's actual activities and actions.

Figure 1:
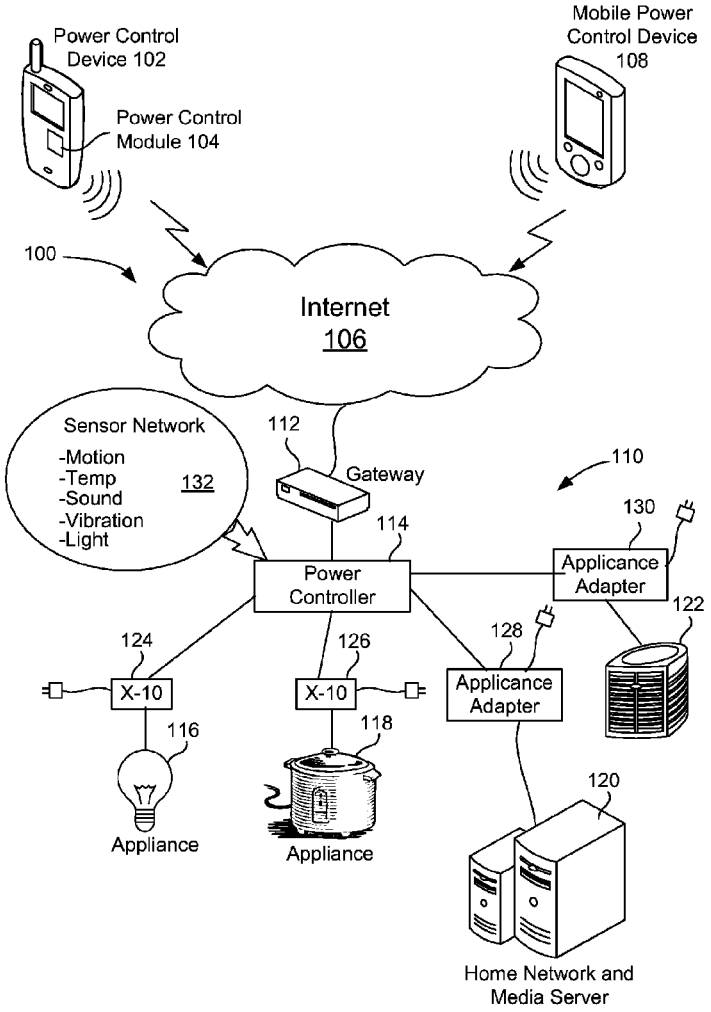
FIG. 1 is an overview network diagram showing relevant components in a power control system in accordance with one embodiment of the present invention.

FIG. 1 is an overview network diagram showing components in a power control system in accordance with one embodiment of the present invention. It shows one scenario in which the present invention may be used. In a power control-enabled device 102, such as a cell phone, contains a power control software or firmware module 104. The user of device 102 may download or install module 104 from the Internet 106, via a memory device, such as a USB key or compatible memory chip. In other embodiments, the user may have power control module 104 installed on device 102 by the service provider or another party. In one case, the user may download software 104 from Internet 106 wirelessly or via a wired connection. Another device 108 may be a dedicated power control mobile device. In this embodiment, the primary function of device 108 is to perform the functions needed for the present invention. Such a device may be installed in a car so that the system, described below, does not have to depend on a user's cell phone or other mobile device. It may also be carried by the user in a purse, briefcase, backpack, or on the person (e.g., in a pocket).

Both devices 102 and 108 are Internet-enabled devices and can communicate data to Internet 106. With dedicated device 108, the user does not have to download or install software or firmware 104 as would be necessary with device 102. In yet another embodiment, a dedicated device, similar to device 108, but smaller and having attachment or coupling means, may be attachable to a cell phone, computer, laptop, etc., thereby making the device power control-enabled (it may also be easily detachable). In either case, device 102 or 108 may use triangulation, GPS services, or other less expensive or complex location-based services (LBSs) to provide location data. As described below, the purpose of the LBS is to provide the location of the user and relay the information.

Power control software/firmware component 104 in device 102 and dedicated device 108 tracks the location of the person carrying the device. Component 104 and device 108 may also communicate the location data, which may include direction data and other information, to a network component, referred to as an adaptive power controller component, described below. This data informs the network component of the location of the user carrying the power control device (devices 102 or 108). Power control software or firmware component 104 or power control dedicated device 108 has the IP addresses of the adaptive power controller component that receives the location data.

The other portion of overview network 100 may be characterized as the "receiving end" and is essentially another network 110. One component in network 110 is a gateway component 112 or firewall. Network 110 may not have such a component, but a gateway or firewall may be desirable to maintain security within network 110. For example, many home networks may have a firewall protecting it from viruses and malware, whereas larger entities may have a gateway. Various embodiments of the present invention may operate without gateway device 112. Connected to gateway 112 is adaptive power controller component 114, described in FIG. 4. In one embodiment, power controller 114 may be a server program within an existing server computer in network 110 or may be a stand-alone device. It may also be embedded in a router device, a TV (e.g., in a set-top box) or in any Internet-connected device. For example, if network 110 is a home network, power controller 114 may be embedded in the home network server. In one embodiment, power controller 114 is purchased or licensed from a provider offering the adaptive power controller (power saving) system of the present invention. Another embodiment is described in FIG. 5 where an adaptive power control tracking service Web server is utilized.

Power controller 114 is connected to one or more appliances 116, 118, 120, and 122 via a receiver adaptor or power adaptor. The connection to the receiver adaptor may be wired or wireless. The term appliance is used to describe any device, apparatus, component, or appliance which needs electrical power to operate and for which the consumer wants to control power supply in order to conserve power, lengthen the life of the appliance or to have operational in time for the user. The range of appliances varies widely and may depend on the context. For example, in a home environment, an appliance may range from a coffee brewer to a central air conditioning unit (such as appliance 122). Other examples include home network and media server (appliance 120), kitchen appliances, lights, heating systems, computers, and so on. In an office environment, examples may include lights, air conditioning, server computers, and the like.

As noted, power controller 114 is connected to appliances via power adaptors. It has a wired or wireless connection with a power adaptor, such as the X-10 power adaptors 124 and 126 or adaptive appliance adaptors 128 and 130 will receive and execute commands from power controller 114. The wired connections may be via Ethernet or serial and wireless connections may be via Bluetooth, RF, or Wi-fi. These units are connected to the appliances and supply power to them. They may be low-cost power adaptors that connect an appliance to a power source and switch power on or off based commands from power controller 114. As shown, power adaptors 124-130 receive A/C power (i.e., they are plugged into normal power outlets). As described below, instructions to power appliances 116 to 122 on or off are received by the power adaptors from power controller 114. Appliance adaptors 128 and 130 may be more sophisticated power adaptor units (compared to the X-10 units) that allow for more "fine tuning" with respect to controlling power and settings of the appliances. They may communicate via Bluetooth, Ethernet, or WiFi with power controller 114. For example, they may allow for greater specificity when controlling the temperature of an A/C unit, heater, or a kitchen appliance (e.g., oven). The X-10 power adaptor is a commercially available unit that can turn an appliance on or off wirelessly using RF frequency.

Adaptive power controller 114 may receive input from one or more sensors. If there is more than one sensor, the one or more sensors may be referred to as a sensor network 132. The sensors may be conventional sensors, including sensors for detecting motion, temperature changes, sound, vibration, and light. For each of these types of sensors, there may be numerous models and makes that vary, for example, in sensitivity, range, power consumption, and the like. There may be other types of sensors not listed that may also be part of sensor network 132. The various embodiments described herein do not focus on the specific types of sensors, but rather on that the data coming from these sensors which is input to adaptive power controller 114 which may use the data to determine how to control appliances 116 to 122. As is known in the art, sensors in network 132 may be spread out in the relevant environment (e.g., home, office building, public facility, business place or store). Temperature sensors may be placed outside and inside a home or office building, as with, motion sensors and sound sensors. In short, sensors may be placed or installed wherever the consumer believes they would be most effective (and according to the instructions and guidelines of the sensor manufacturer). It is worth noting that adaptive power controller 114 may receive input data from sensor network 132 and from gateway 112 via Internet 106. In other embodiments, there may not be any sensor data or sensor network 132. The operations of the adaptive power controller 114 may be based only on location data, as described below. Some appliances 116-122 may not be dependent on or have rules that involve sensor data, but are only dependent on user-location data, estimated arrival time, and other data. Examples of such devices may be computers, home theaters, kitchen oven, and the like.

Figure 2A:
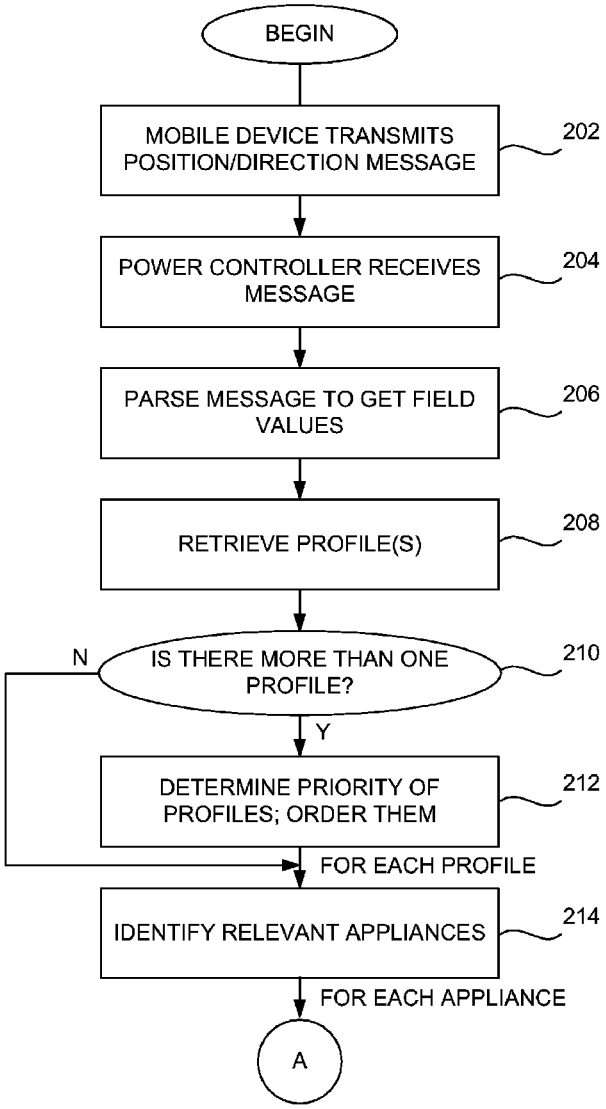
FIG. 2 is a flow diagram of a process of controlling power to appliances based on power profiles and location data of a consumer in accordance with one embodiment.
Figure 2B:
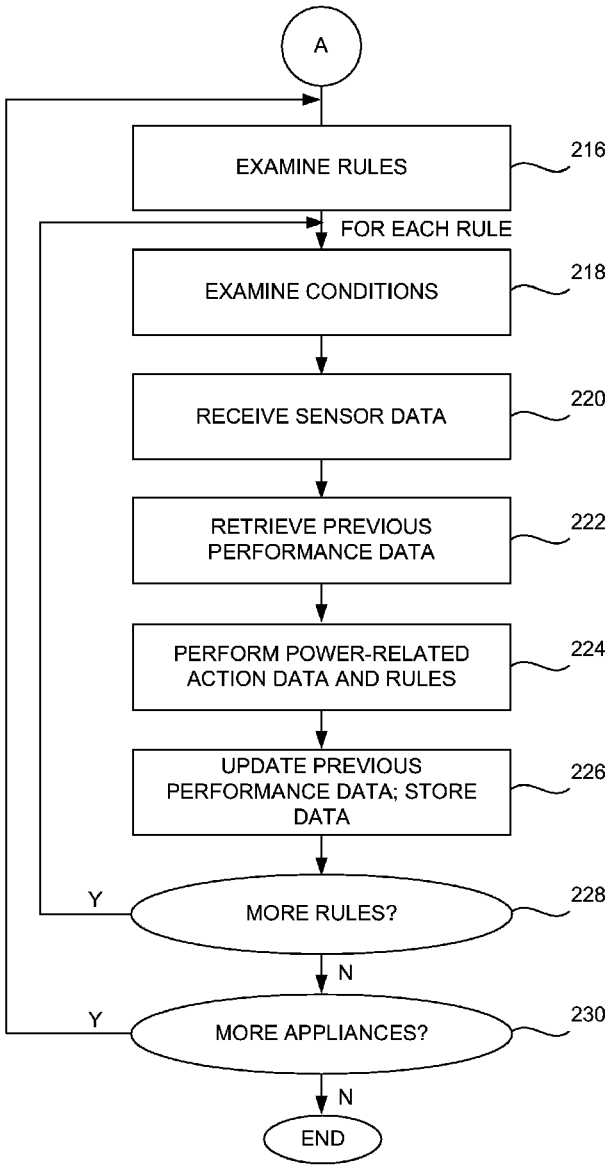

FIG. 2 is a flow diagram of a process of controlling power to appliances based on power-saving profiles and location data of a consumer in accordance with one embodiment. Before step 202, a mobile device, such as a smart phone or mobile computing device, is pre-configured with adaptive power control software component 104. This may be downloaded or installed via other means as noted above. This does not have to be done for dedicated power control devices, such as device 108. Both types of devices have the IP address of the relevant adaptive power controller 114, as described below.

At step 202 the mobile device transmits a message to power controller 114 via Internet 106. The location message contains position or location data of the device and may also include directional and other data. The device may use any suitable LBS to determine its location, such as triangulation, GPS, and others. The location data may include longitude and latitude data. In one embodiment, the message is sent using the REST protocol and API via HTTP or HTTPS. As is known in the field, REST is a commonly used protocol and API for transmitting messages requesting Web services on the Internet, such as requesting the use of a Web search engine (the search request is in a REST formatted message). The message transmitted by the device contains accurate location, position, and/or directional data of the device (and, therefore, of the consumer). The transmission frequency of this message may depend on the size and power capabilities of the device. If the device is small and has limited battery power (like many cell phones), the message may not be sent very frequently in order to conserve battery power. The frequency and scheduling of when such location messages are sent may be one of the features used to pre-configure the device prior to step 202. A dedicated adaptive power control-enabled device, such as device 108, may draw power from a car battery, for example, and may send messages frequently. In another embodiment, described below, some of the calculations to determine an estimated arrival time that may normally be performed on adaptive power controller 114 may instead be done on the device itself, thereby easing the processing load of controller 114.

At step 204 power controller 114, having its own IP address receives a location message. The message may pass through gateway component 112 or firewall before reaching power controller. At step 206 the location message is parsed by the power controller. In addition to containing position data (the primary data component in the message), in one embodiment, it also contains various other data types stored in various fields. These may include device ID which is an identifier of the power control device and an appliance identifier, discussed below. Before step 206 or during this step, the power controller may use the device ID data to verify that the message is being sent from a legitimate or authorized device. For example, the device should belong, for example, to a consumer, a member of a family (in a home environment), or an employee-consumer (if in an office environment). The device ID may correspond to a particular consumer (a parent or a child in a family) or group. Other data fields may include arrival time and duration. An example of a location message using the REST API is:
is a URL.

At step 208 the power controller retrieves one or more power saving profiles based on the device ID. A sample power-saving profile, which contain condition-based rules used to determine when to supply power to an appliance, is provided below. Power controller, described in FIG. 4, may have a repository of power profiles that are indexed or searchable based on device ID or user (consumer) ID. Once the profile or profiles are retrieved at step 208, at step 210 the power controller determines whether there is more than one profile. A specific device ID (such as, for example, the dedicated power control device in the family car) may have three or four power profiles associated with it, whereas the device ID from a cell phone for a teenager in the family may have only one profile associated with it. If there is only one profile retrieved, control goes to step 214. If there is more than one profile, control goes to step 212 where the power controller determines the priority of the profiles and places them in a specific order. In one embodiment, a profile may have either a global scope or an individual scope. In other embodiments, there may be more scopes. The priorities of the profiles may depend on the priority of the user (e.g., a parent may have a higher priority than a child). Once the priorities and the order of the profiles are determined at step 212, control goes to step 214. The processes beginning at step 214 are done for each profile if there is more than one. In one embodiment, a user may have multiple profiles.

At step 214 the profile is read and the relevant appliances are identified. A sample profile is provided below:

```
<profile>
<name> name of profile </name>
<device>
    <name> name of device or applicance </name>
    <id> device id </id>
```

-continued

```
        <sensor>
            <name> temperature sensor 1 - outdoor </sensor>
            <id> TEMPER01</id>
            <protocol> X10 </protocol>
            <command_info>
                <file> sensor_cmd_01.txt </file>
            </commands_info>
        </sensor>
        <sensor>
            <name> temp sensor 2 - indoor </sensor>
            <id> TEMPER02</id>
            <protocol> X10 </protocol>
            <command_info>
                <file> sensor_cmd_01.txt </file>
            </commands_info>
        </sensor>
        <user_location derivation>
            <name> Smith's location </sensor>
            <id> USERLOC01</id>
            <protocol> REST::APCS </protocol>
            <command_info>
                <file> user_location_cmd_01.txt </file>
            </commands_info>
        </user_location derivation>
        <condition>
            <name> cond_1 </name>
            <value> USERLOC01 @home</ value >
        </ condition >
        < condition >
            <name> cond_2 </name>
            < value > TEMPER02::68-70 F </ value >
        </ condition >
        <rule>
            <on> cond_1 && NOT cond_2 </on>
            <off> NOT cond_1 </off>
        </rule>
    </device>
    </profile>
```

Each power-saving profile contains information on how to control at least one appliance. It may contain instructions on how to control numerous appliances. At step 214, each appliance (e.g., computer, A/C unit, kitchen appliance, etc.) is identified and listed. At step 216, for each appliance, relevant rules are examined. Each appliance may have at least one rule which dictates when the appliance should be turned on or off using at least one metric (e.g., temperature, amount of daylight, and the like). An example of a rule is "if indoor temperature is less than 69 degrees, increase heat" or "if outdoor daylight is less than 86 lumens, turn on outdoor lights," or "if there is motion in a hallway and it is after 7 pm, turn on indoor lights." Each rule may have at least one or more conditions associated with it. At step 218 the one or more conditions are examined for each rule. Thus, using the above examples, the condition for the first rule may be indoor temperature, for the second rule, outdoor daylight, and for the third, motion in hallway and time of day.

At step 220 power controller 114 receives data from the sensor network or from one sensor. The sensor data it receives is relevant to the condition. For example, for the first rule and the one condition associated with the rule, the sensor data is indoor temperature data from indoor temperature sensors, (i.e., thermometers). If the rule being examined is the second rule ("if outdoor daylight is less than 86 lumens, turn on outdoor lights"), the sensor data received may be light data from outdoor light sensors. In other embodiments, power controller 114 may not receive nay sensor data.

At step 222, power controller 114 retrieves data that may be referred to as "previous performance" data or historical data stored in its own repositories. This data corresponds to the specific appliance and how that appliance has responded to power commands in the past. This data may be more applicable to appliances where there is some type of incremental adjustment necessary, rather than to an appliance that has a strict binary operation (on/off) and has an effect that occurs immediately upon powering on (e.g., turning on a light). One example of previous performance data may relate to air conditioning (cooling or heating of an environment) and may provide indications of how the appliance, e.g., central A/C unit, performs under various conditions. For example, the historical data may indicate that in the past, it took 10 minutes for the A/C unit to cool the environment (e.g., a living room) from 75 degrees to 70 degrees when the unit was turned on to maximum "COOL" level. This data may also include the other temperature at the time. Similarly, the previous performance data may indicate that a heating unit took 13 minutes to heat an office floor from 64 degrees to 70 degrees. In another example, relating to an office server computer, previous performance data may indicate that it took 2.5 minutes to boot up. Other examples may include simple kitchen appliances, such as the time it takes to pre-heat an oven or start a kitchen appliance. This previous performance data may be taken into consideration by the power controller in determining at what time to supply or adjust power to an appliance with respect to the user's estimated arrival time.

At step 224 the power controller performs a power-related action based on the data and rules described above and on the data received in the location messages. The location data provides an estimated amount of time before a user reaches a destination, i.e., an estimated arrival time. It also provides data on whether the user has made a detour, has stopped somewhere, is in traffic and may be delayed, or other factors that may affect the amount of time before the user reaches the destination (i.e., location of the appliance). The action by power controller 114 taken may be to transmit a signal to the power unit (X-10 or appliance adaptor) to either turn on or off an appliance or adjust the controls of an appliance (e.g., increase or decrease the brightness of a light, turn up or down a heater or increase cooling from an A/C unit, and so on). That is, "fine tune" the appliance, rather than simply turning it on or off. As noted, the appliance adaptor unit (e.g., units 128 and 130 in FIG. 1) is well-suited for doing this type of adjustment of appliances, whereas the X-10 module capabilities may be limited to turning appliances on or off (such as computers, lights, and so on).

At step 226, after the appliance has either been turned on or off, or adjusted in some manner "performance," data relating to the amount of time it took the appliance to reach the intended goal gives the specific power-related action is recorded and stored, assuming such data is available in the particular context. This previous performance data is specific to a particular appliance and, thus may be dependent on the model, year, wear and tear, technical specifications, etc. of the appliance. The variety of contexts where such data would be available (that is, would make sense to collect and store) are described above. For example, previous performance data may not be collected for turning lights on or off. However, data may be collected and stored for most temperature-related power actions (cooling or heating an environment).

At step 228 the power controller checks to see if there are more rules associated with the selected appliance. If there are more rules, control returns to step 218 (examine conditions for next rule), where the process repeats from step 218 to step 228. If there are no more rules for the appliance, control goes to step 230 where the power controller checks to see if there are more appliances in the profile. Recall that in step 214, all the relevant appliances for each profile were identified. If there are more appliances, control goes to step 216 where the one or more rules for the appliance are examined and the process repeats for the appliance (i.e., rules for the appliance are examined and the process is repeated for each rule, and so on). If there are no more appliances, the process for one profile is complete. At step 208, the message received from the device is parsed and the number of profiles associated with the message is identified and retrieved. If there is only one profile, the process is complete after step 230. If there are more profiles, the process returns to step 214 where the relevant appliances for the selected profile are identified. The process may then continue until all profiles are examined and power-related actions have been taken by the power controller at step 224. It is worth noting that in some cases no power-related actions may be taken based on the outcome of the rules, sensor data, and/or location data (relevant time frames).

Figure 3:
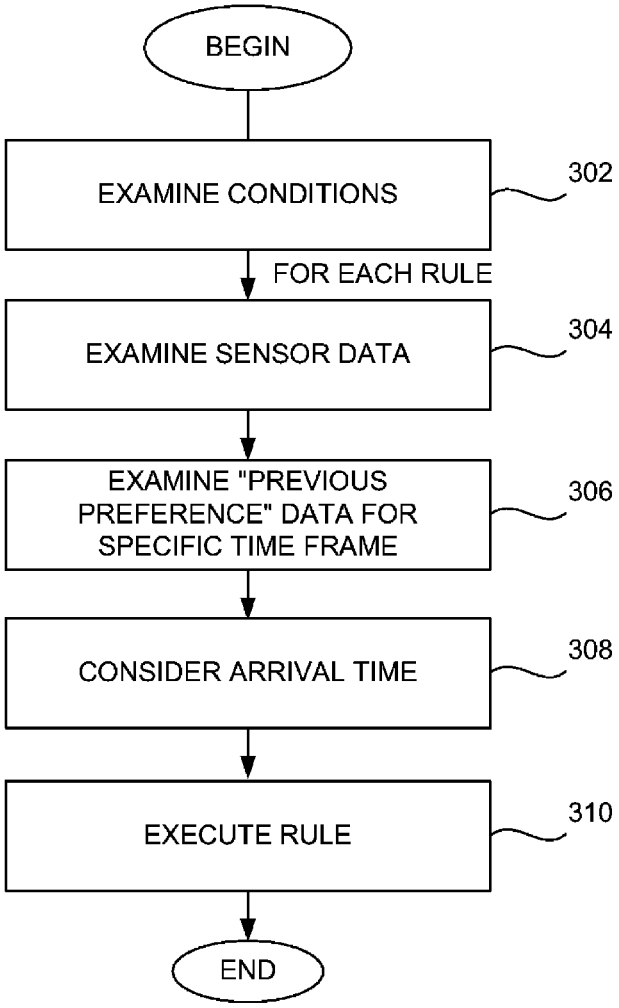
FIG. 3 is a flow diagram showing in greater detail step 224 where the power controller performs power-related actions with respect to a particular appliance in accordance with one embodiment.

FIG. 3 is a flow diagram showing in greater detail step 224 where the power controller performs power-related actions with respect to a particular appliance in accordance with one embodiment. Some of the steps of FIG. 3 are the same or similar to steps described in FIG. 2; however, it is useful to elaborate on these steps in more detail and describe related steps not mentioned in FIG. 2. At step 302 the power controller examines conditions that comprise the rule being examined (see step 216 of FIG. 2). As noted above, the conditions may relate to temperature, time, amount of light, motion, sound, vibrations, and so on. At step 304 the sensor data received by the power controller from the sensor network is examined. However, the power controller may only want to receive and examine the relevant sensor data. For example, sound data is not needed if the appliance is a computer or an A/C unit. Which sensor data is relevant to the appliance is evident from the rule and conditions contained in the profile being examined.

At step 306 the power controller examines the previous performance or historical data relating to the specific appliance to get a better estimate of when the controller should start power to the appliance and at what level (if applicable). The previous performance data may provide some guidance to the power controller as to how the appliance reacts or behaves under specific circumstances, such as the amount of time it takes the appliance to begin operating effectively if the outside temperature is below freezing or how long does the appliance take to turn on and be operational if other related appliances are turned off, and so on. This added intelligence may allow the power controller to make a better estimate of when to turn on (or turn off) the appliance. As noted, for certain appliances, there may be no previous performance data stored or needed, such as for simple or less complex appliances.

At step 308 the power controller examines the estimated arrival time of the user to reach the destination, such as a home, office vacation home, and the like. At this stage the power controller takes into consideration the time aspect of the calculation. As noted above, the power controller enables efficient use of power in turning appliances on or off so that little energy is wasted and so that the appliance is operational or has performed its operation at the time needed by the user. An important part of this calculation is determining the amount of time before the user reaches the destination. The power control-enabled or dedicated device (devices 102 and 108) provides position/location data to the power controller. It may also provide directional data and vehicle speed (if travelling in a car, train, and so on). The power controller may know that if the user is at location B which is 10 miles from the user's destination A, it will take the user seven minutes to reach destination A assuming there is no traffic or detours. The controller uses this arrival time estimate to determine when to turn on or adjust power to the appliance. If the next message indicates that the user has made a stop, the new time estimate is used (this estimate may be something like "arrival time unknown" or "undetermined"). As noted, the more frequently the device transmits messages to the power controller, the more accurately the controller can determine an arrival time. At step 310 the power controller executes the specific rule for the appliance taking into consideration all the data from the previous steps. In the described embodiment, the time when action is taken on an appliance is based in part on the arrival time, along with other factors. The action may be to do nothing and wait to receive the next message.

Figure 4:
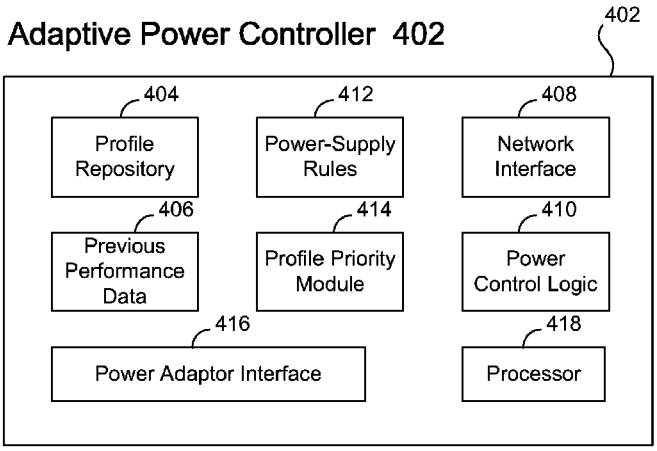
FIG. 4 is a logical block diagram of power controller in accordance with one embodiment.

FIG. 4 is a logical block diagram of an adaptive power controller in accordance with one embodiment. Power controller 402 contains various components and data relevant to the various embodiments of the present invention. They include a profile repository 404 or, more generally, a repository of data sets or files containing user power-saving profile data as described above, a previous performance (historical) data repository 406, a network interface 408, and an adaptive power controller logic component 410. The profiles and previous performance data are stored in a memory component in the power controller, such as a RAM or non-volatile memory (not shown). Also stored in the memory are power-supply rules 412. Power controller 402 may also contain a profile priority module 414 (see step 212). Other hardware components include a power adaptor interface 416 and a processor 418. More generic diagrams of a computing device are provided in FIGS. 6A and 6B. These figures show more detailed components that may be contained in power controller 402. Power controller logic 410 may be in the form of software or firmware and may execute the processes described above in FIGS. 2 and 3, in which power controller 402 determines when to supply power to (or cut/decrease power to) appliances and when to do so based on the various factors.

Figure 5:
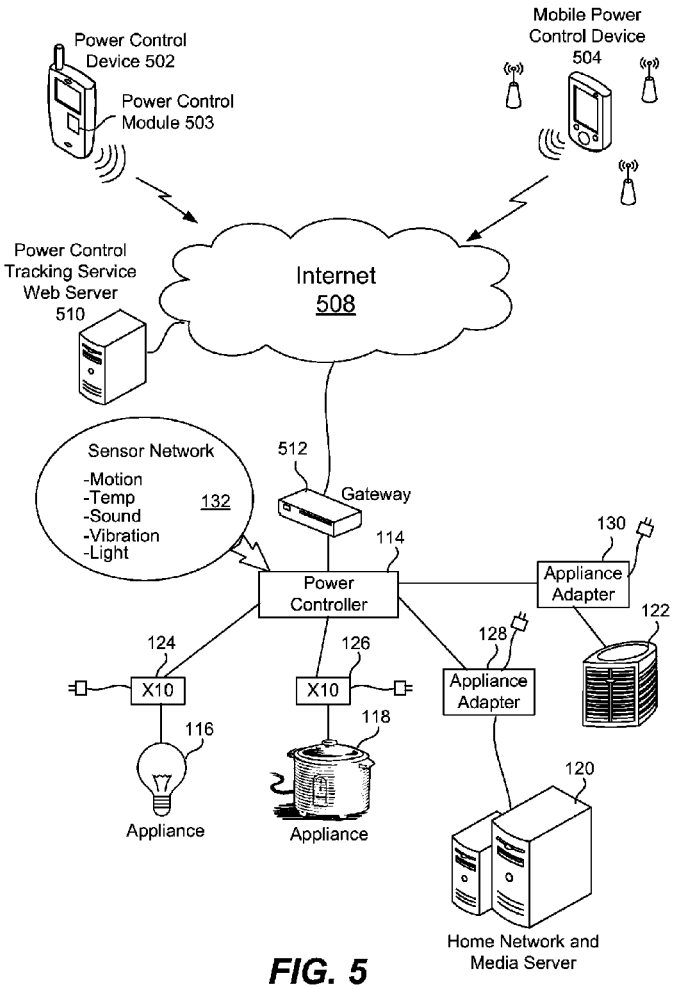
FIG. 5 is an overview network diagram showing an alternative embodiment.

FIG. 5 is an overview network diagram similar to FIG. 1 showing an alternative embodiment. A power control-enabled device 502 having a power control module 503 and a mobile power control dedicated device 504 (same as devices 102 and 108) transmit messages using REST API over Internet 508 to an adaptive power-controller tracking service server 510. Gateways, firewalls, and power controllers, such as gateway 512, may then connect with server 510 over Internet 508 (for purposes of illustration, FIG. 5 shows the connection between gateway 512 and server 510 as a direct connection). The network segment "behind" gateway component 512 is the same as the network shown in FIG. 1. That is, adaptive power controller 114 is connected to various X-10 adaptors and appliance adaptors which, in turn, are connected directly to various types of appliances. The input to power controller 114 may be the same as in FIG. 1, namely, sensor data from a sensor network 132. In this embodiment, an example of a position data message sent from device 502 or 504 using a REST API may be:
be a URL.

The message may be sent to the tracking service Web server and stored. Thus, in this embodiment, devices 502 and 504 need to know the IP address of tracking server 510. It may also know the IP address of the power controller 114 itself, as in the embodiment above, in the event there is a malfunction with tracking server 510. Power controller 114 at the home, office or other location periodically checks tracking server 510 for any updated position messages from devices it has registered. Power controller 114 has the IP address of tracking server 510 and may use a REST-based message such:

such as a URL.

In other embodiments, other protocols may be used to format the requests. The frequency of the position data update requests may depend on the how the user configures power controller 114. Requests to server 510 may be sent as often as desired (the more often updates from server 510 are obtained, the more accurate the time calculations may be). When tracking server 510 receives the request, it returns (i.e., forwards) the position data message it receives from devices 502, 504 to power controller 114. Once power controller 114 receives the position message, the process is the same as the processes described above in FIGS. 2 and 3.

In one embodiment, a user is able to install her power-saving profiles onto other power controllers at other locations. A user may be able to remove or copy power-saving (preference) profiles onto a storage medium, such as a USB key or CD-ROM, or have them stored on a server on the Internet and use them on other power controllers. The user's power profiles are portable and can travel with the user. They are also easily configurable and may be changed to meet the needs of the user as needs change. Additional profiles may also be added or deleted as needed. In this manner, the user can conserve power and general "wear and tear" on the appliances wherever she goes. In another embodiment, the user's power profiles may be exported from the user's primary power controller to another power controller upon request by the user. The other power controller, for example, may be at a vacation home, a hotel, a new user residence, another office, and so on. For example, if the user reserves a hotel room online and that hotel has a power controller as described above, the user may request that her power profile be sent to the hotel's power controller so it may be used to control the environment of the room before the user arrives and during her stay. In this manner, the appliances used by the user that are present in the hotel will be powered on and off as they would at the user's home or office, such as controlling air temperature, water temperature, and so on, without the user having to manually carry the profile (e.g., on a USB key) to the hotel and installing it once she arrives there.

Figure 6A:
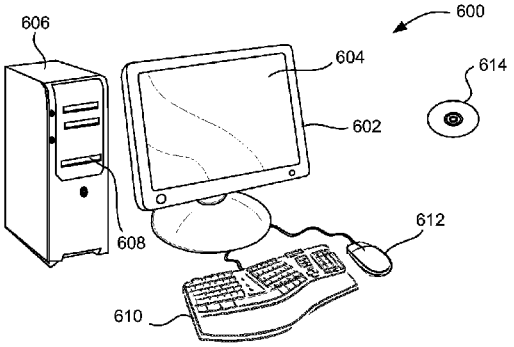
FIGS. 6A and 6B are illustrations of a computing system suitable for implementing embodiments of the present invention.
Figure 6B:
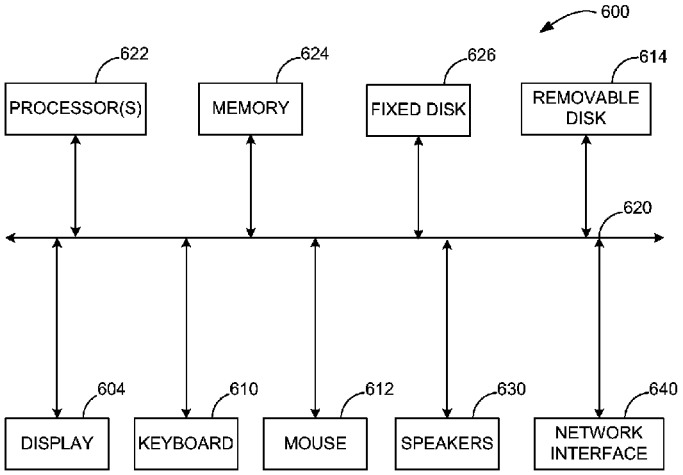

FIGS. 6A and 6B illustrate a computing system 600 suitable for implementing embodiments of the present invention. For example, computing system 600 may be power controller 114 or power control tracking Web server 510. FIG. 6A shows one possible physical implementation of the computing system (shown as a PC for illustration only). Of course, the internal components of the computing system may have many physical forms including an integrated circuit, a printed circuit board, a small handheld device (such as a mobile telephone, handset or PDA), a personal computer or a server computer, a mobile computing device, an Internet appliance, and the like. In one embodiment, computing system 600 includes a monitor 602, a display 604, a housing 606, a disk drive 608, a keyboard 610 and a mouse 612. Disk 614 is a computer-readable medium used to transfer data to and from computer system 600. Other computer-readable media may include USB memory devices and various types of memory chips, sticks, and cards.

FIG. 6B is an example of a block diagram for computing system 600. Attached to system bus 620 are a wide variety of subsystems. Processor(s) 622 (also referred to as central processing units, or CPUs) are coupled to storage devices including memory 624. Memory 624 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A fixed disk 626 is also coupled bi-directionally to CPU 622; it provides additional data storage capacity and may also include any of the computer-readable media described below. Fixed disk 626 may be used to store programs, data and the like and is typically a secondary storage medium (such as a hard disk) that is slower than primary storage. It will be appreciated that the information retained within fixed disk 626, may, in appropriate cases, be incorporated in standard fashion as virtual memory in memory 624. Removable disk 614 may take the form of any of the computer-readable media described below.

CPU 622 is also coupled to a variety of input/output devices such as display 604, keyboard 610, mouse 612 and speakers 630. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 622 optionally may be coupled to another computer or telecommunications network using network interface 640. With such a network interface, it is contemplated that the CPU might receive information from the network, or might output information to the network in the course of performing the above-described method steps. Furthermore, method embodiments of the present invention may execute solely upon CPU 622 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape, optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher-level code that are executed by a computer using an interpreter.

Although illustrative embodiments and applications of this invention are shown and described herein, many variations and modifications are possible which remain within the concept, scope, and spirit of the invention, and these variations would become clear to those of ordinary skill in the art after perusal of this application. Accordingly, the embodiments described are illustrative and not restrictive, and the invention is not to be limited to the details given herein, but may be modified within the scope and equivalents of the appended claims.

What is claimed is:

1. A method of controlling operation of a power-consuming appliance, the method comprising:

receiving a location message from a power-control enabled device, the location message containing position data consisting of longitudinal data, latitude data, arrival time, and duration and device data, wherein the location message utilizes [the] *a* REST protocol and API;

retrieving a power-related profile relating to a user using the device data, wherein the power-related profile includes a profile name, one or more device names, a user location process module, a protocol indicator, one or more conditions involving user location, and one or more rules involving the conditions;

determining which appliances are related to the power-related profile; and controlling operation of the power-consuming appliance utilizing the position data, wherein timing of appliance operation is determined based on a user location as indicated by the longitudinal data and the latitude data, arrival time, and duration of time between specific destinations under certain traffic conditions.

2. A method as recited in claim 1 wherein controlling operation of the power-consuming appliance further comprises executing power-related rules.

3. A method as recited in claim 1 further comprising receiving sensor component data.

4. A method as recited in claim 1 wherein controlling operation of the appliance further comprises retrieving previous power-related performance data relating to the power-consuming appliance.

5. A method as recited in claim 2 wherein controlling operation of the power-consuming appliance further comprises examining condition outcome data resulting from execution of the power-related rules.

6. A method as recited in claim 1 further comprising identifying the power-consuming appliance in the power-related profile.

7. A method as recited in claim 3 wherein controlling operation of the power-consuming appliance further comprising examining sensor component data.

8. An apparatus for controlling operation of a power-consuming appliance, the apparatus comprising:

a network interface for receiving a location message from a power-control enabled device, the location message containing position consisting of longitudinal data, latitude data, arrival time, and duration and device data, wherein the location message utilizes [the] *a* REST protocol and API;

means for retrieving a power-related profile relating to a user using the device data in the location message, wherein the power-related profile includes a profile name, one or more device names, a user location process module, a protocol indicator, one or more conditions involving user location, and one or more rules involving the conditions; and means for controlling operation of the power-consuming appliance utilizing the position data in the location message, wherein timing of appliance operation is determined based on a user location as indicated by the longitudinal data and the latitude data arrival time, and duration of time between specific destinations under certain traffic conditions.

9. An apparatus as recited in claim 8 wherein the means for controlling operation of the power-consuming appliance further comprises means for executing power-related rules.

10. An apparatus as recited in claim 8 further comprising a means for receiving sensor component data.

11. An apparatus as recited in claim 8 wherein the means for controlling operation of the appliance further comprises a means for retrieving previous power-related performance data relating to the power-consuming appliance.

12. An apparatus as recited in claim 8 further comprising a means for parsing the location message.

13. An apparatus as recited in claim 8 further comprising a means for identifying the power-consuming appliance in the power-related profile.

14. A non-transitory computer-readable medium storing computer instructions [for controlling operation of a power-consuming appliance], the [computer-readable medium] *computer instructions executed by a processor to perform a method of controlling operation of a power-consuming appliance, the method* comprising:

[computer code for] receiving a location message from a power-control enabled device, the location message containing position data consisting of longitudinal data, latitude data, arrival time, and duration and device data, wherein the location message utilizes [the] *a* REST protocol and API;

[computer code] retrieving a power-related profile relating to a user using the device data, wherein the power-related profile includes a profile name, one or more device names, a user location process module, a protocol indicator, one or more conditions involving user location, and one or more rules involving the conditions; and

[computer code for] controlling operation of the power-consuming appliance utilizing the position data, wherein timing of appliance operation is determined based on a user location as indicated by the longitudinal data and the latitude data, arrival time, and duration of time between specific destinations under certain traffic conditions.

* * * * *